Oct. 6, 1931.    S. C. BOND    1,825,896
PROCESS OF DETERMINING MOISTURE CONTENT
Filed March 11, 1929
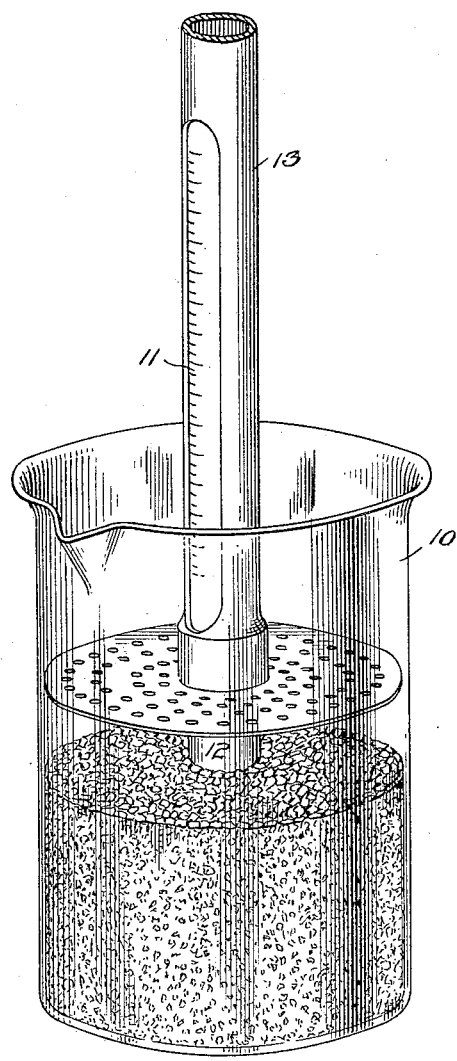
Inventor
Samuel C. Bond
By
his Attorneys Patented Oct. 6, 1931

1,825,896

UNITED STATES PATENT OFFICE

SAMUEL C. BOND, OF HOLLY OAK, DELAWARE, ASSIGNOR TO THE HENRY P. SCOTT COMPANY, A CORPORATION OF DELAWARE, AS TRUSTEE

PROCESS OF DETERMINING MOISTURE CONTENT

Application filed March 11, 1929. Serial No. 346,062.

This invention relates to a process for determining the moisture content of materials, such as, for instance, cork, textiles, grain and the like.

The object of the invention is to provide a process or method whereby the amount of water present in a material may be quickly and accurately ascertained. For instance, in the purchasing of materials, such as cork, textiles or grain, it is necessary to know the moisture content thereof. Again, in the treatment of different materials wherein they are either dried or moisture added to them, it is sometimes necessary to know to just what point that particular step has been carried.

In the present process what is termed "heat of solution" is used, i. e., the change in temperature of certain chemicals when brought into contact with water. Various chemicals may be used, such as nitric acid or sulphuric acid, but the latter is preferred because it is not only comparatively inexpensive and easily obtainable but the changes in temperature upon the addition of water are sufficiently great to enable accurate determination to be made.

In the accompanying drawing, there is illustrated a comparatively simple apparatus for carrying out the present process.

The first procedure is to prepare a certain number of samples of the material, say cork, to be tested. These samples each have a known moisture content. One may be bone dry, the second may have a moisture content of say 2½ per cent; the third 5 per cent; the fourth 7½ per cent and so on up to any desired point. A measured quantity of these several samples is then taken and, after ascertaining the temperature thereof, each is separately mixed rather rapidly with a measured quantity of a chemical reagent which will effect a variation of the temperature of the mixture upon coming in contact with the moisture in the cork. This chemical should also be at the same temperature of the cork. As has been pointed out, sulphuric acid is preferable for this purpose although other chemicals may be used as will be later pointed out.

Having noted the original temperature of the cork, the increase or decrease in the temperature of the mixture thus made is also noted in each of the samples tested and a table or chart of the several temperature variances made for use in testing like materials of unknown moisture content. Instead of using samples as above outlined for the purpose of preparing such a chart, it will be appreciated that the quantities of the material and acid used in the preliminary tests can be so adjusted that each degree on the thermometer will represent or indicate 1 per cent moisture in the material over a considerable range of moisture content.

Having prepared a chart or table as above outlined, when material having an unknown moisture content is to be tested, a quantity thereof corresponding to the quantities used in the first tests is mixed with a corresponding quantity of the chemical. The temperatures of said ingredients having been taken before mixing, the increase in temperature of the mixture is noted and compared with the chart, the corresponding temperature variation on the chart indicating accurately the moisture content of the material.

Various forms of apparatus may, of course, be utilized in practicing the present invention. One form only is shown more or less diagrammatically in the single figure of the accompanying drawing.

In said drawing there is shown a glass beaker 10 for the material, say cork, to be tested. A thermometer 11 within a plunger 12 is adapted to be inserted in the material in said beaker. The plunger has a hollow handle portion 13 and may be perforated at the end inserted in the material to expose the thermometer to the material. A measured quantity of acid is placed in the beaker 10 and the temperature taken. A measured quantity of cork, whose temperature is also first taken, is then placed in the acid. The plunger and thermometer are then immediately inserted in the mixture being slowly raised and lowered therein to insure thorough wetting of the cork with the acid. At the expiration of approximately three minutes, the temperature of the mixture is noted, the difference between that temperature and the temperature of the individual ingredients, before mixing, indicating or representing the percentage of water in the sample tested.

Another example that might be given, is where it is desired to ascertain the water content of alcohol. A predetermined quantity of methyl alcohol, for instance, has been mixed with calcium chloride. In this example, it will be noted that the material being tested is liquid while the chemical used is a solid. Furthermore, as above noted, the materials, when mixed, may be of lower temperature than before mixing but it will be appreciated that the same kind of chart may be prepared under these circumstances for testing subsequent quantities of the material.

It will, of course, be understood that it is immaterial whether the cork or acid is first placed in beaker 10.

What I claim is:

1. The process of determining the moisture content of cork which consists in mixing predetermined quantities of cork and sulphuric acid at known temperatures, ascertaining the increased temperature of said mixture, and comparing the difference between those temperatures with variances of temperature in mixtures of similar quantities of cork of known water content with similar quantities of sulphuric acid under like conditions.

2. The process of determining the moisture content of cork which consists in mixing a predetermined quantity of cork of known temperature with a measured quantity of chemical reagent of the same temperature and which will evolve heat when mixed with said cork, ascertaining the difference between the original temperature of the cork and that of the mixture, and comparing the difference in said temperatures with variances of temperature in mixtures of similar quantities of cork of known moisture content and chemical reagent under like temperature conditions.

3. The process of determining the moisture content of cork which consists in mixing a predetermined quantity of cork at a known temperature with a measured quantity of chemical reagent which will evolve heat when mixed with said cork, said reagent being at the same temperature as the cork; determining the difference between the original temperatures of said ingredients and the temperature of the mixture; and comparing the difference between those temperatures with variances of temperatures effected by mixing like quantities of said cork of known moisture content and at a like temperature with corresponding quantities of said reagent at the same temperature.

SAMUEL C. BOND.